Feb. 11, 1964    H. L. COX ETAL    3,120,842
EQUALIZER FOR SHEAR
Filed March 15, 1961    4 Sheets-Sheet 1
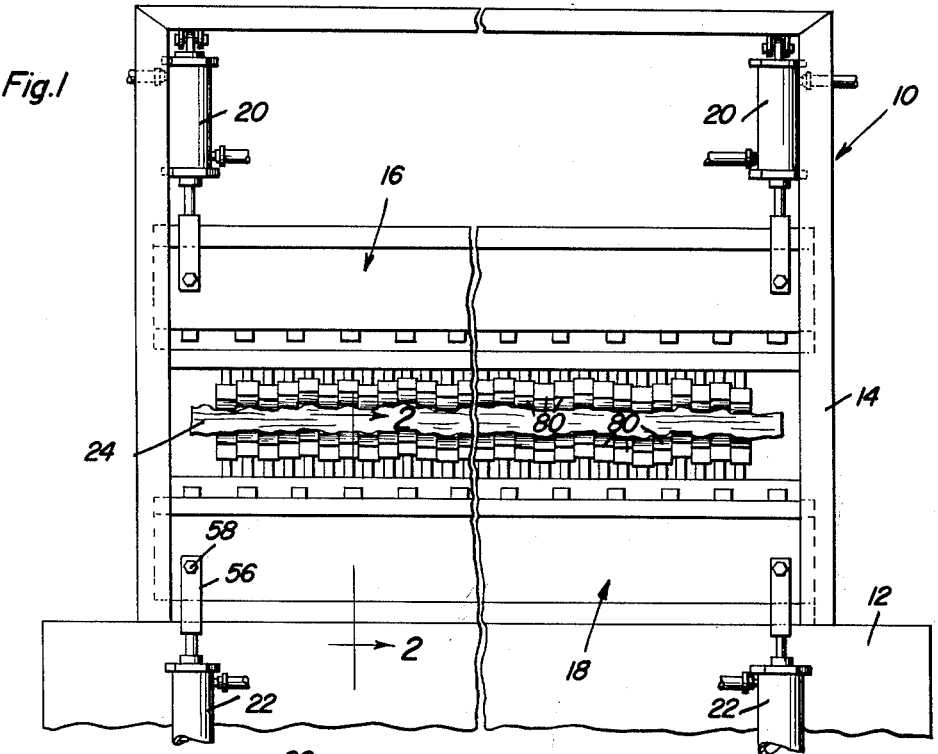
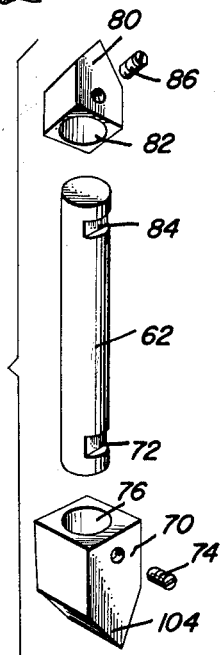
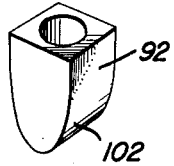
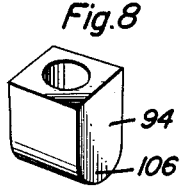
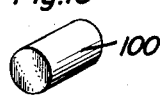
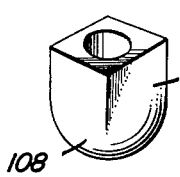
Harold L. Cox
Raymond A. Chabot
Earl W. Strahorn
INVENTORS
BY *Clarence A. O'Brien*
and *Harvey B. Jacobson*
Attorneys Feb. 11, 1964  H. L. COX ETAL  3,120,842
EQUALIZER FOR SHEAR
Filed March 15, 1961  4 Sheets-Sheet 2
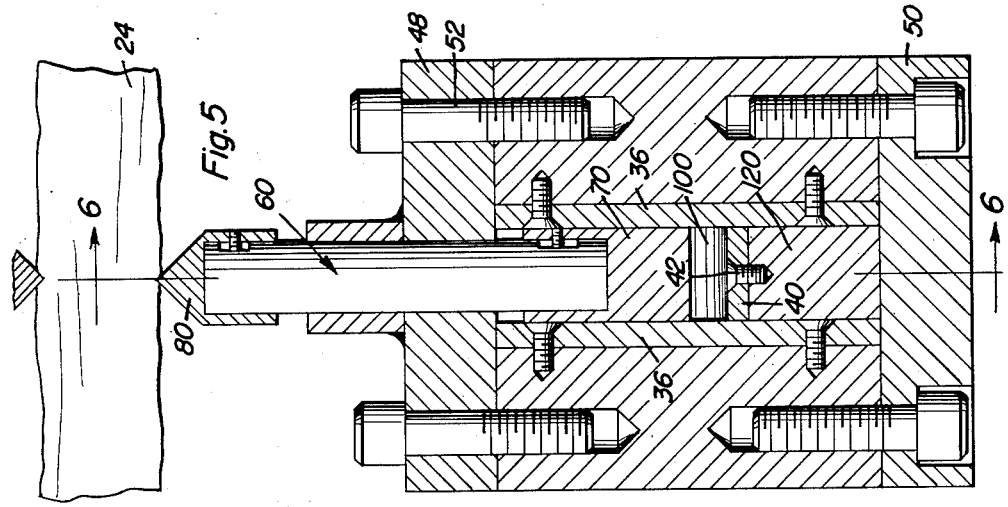
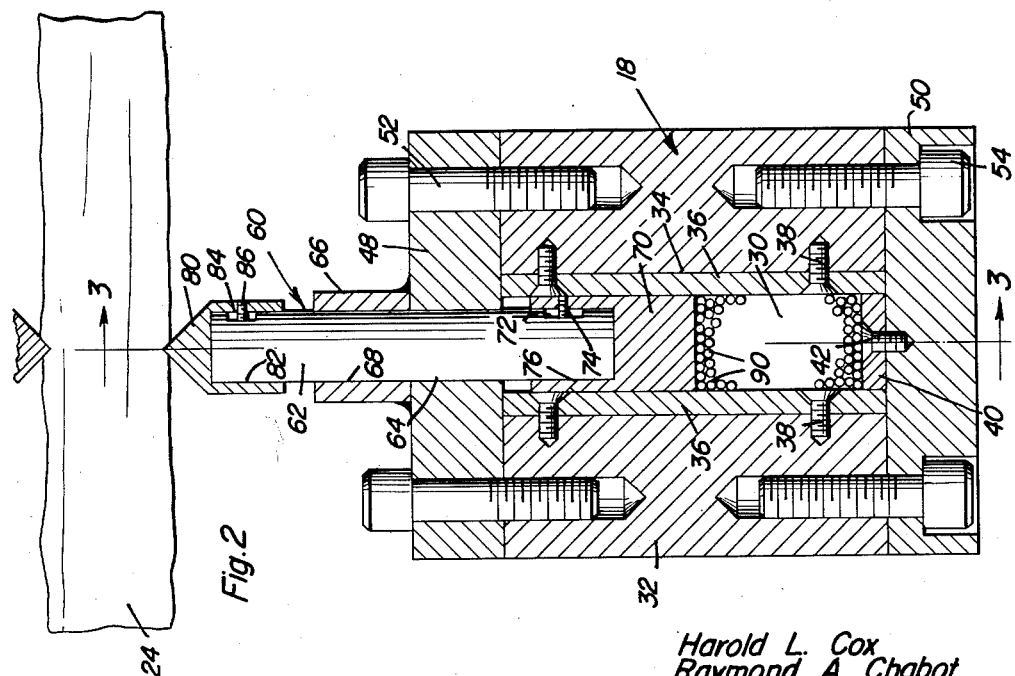
Harold L. Cox
Raymond A. Chabot
Earl W. Strahorn
INVENTORS
BY Clarence A. O'Brien
and Harvey B. Jacobson
Attorneys

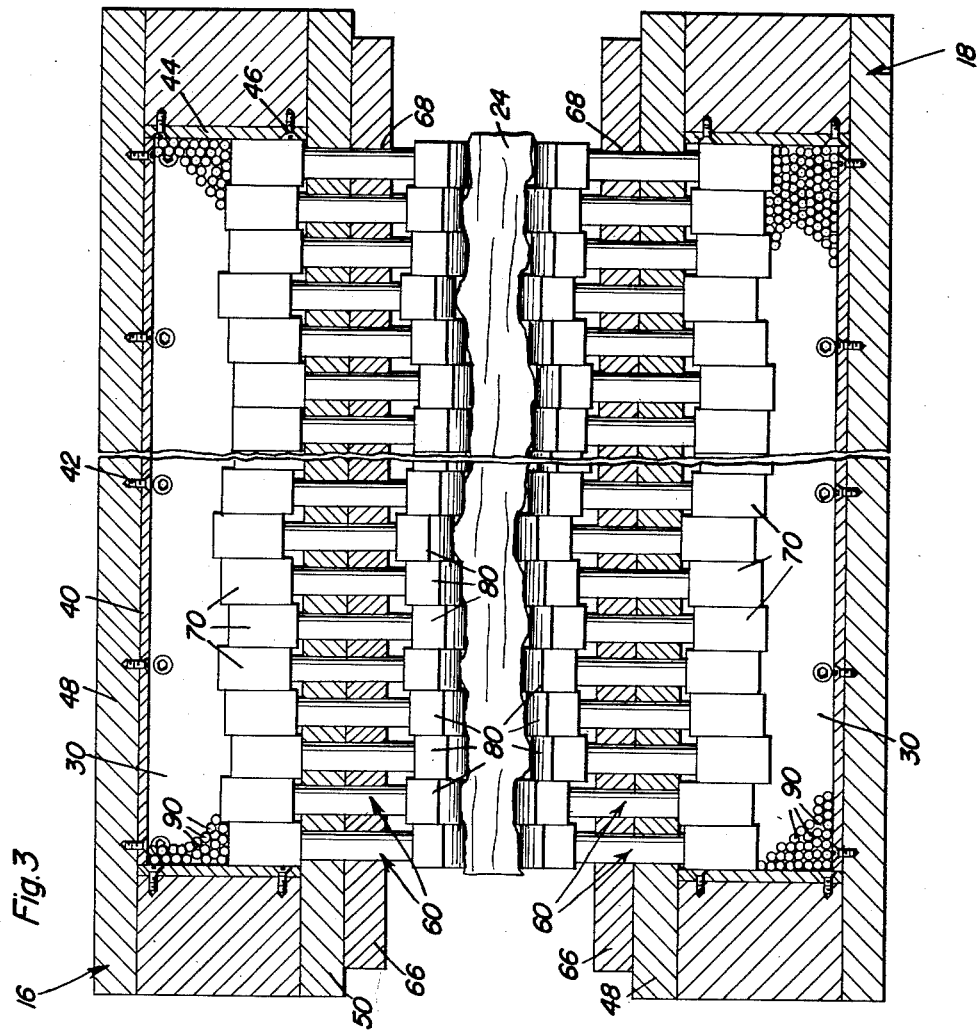

United States Patent Office 3,120,842
Patented Feb. 11, 1964

3,120,842
EQUALIZER FOR SHEAR
Harold L. Cox, Raymond A. Chabot, and Earl W. Strahorn, all of 12155 Woodbine, Detroit 39, Mich.
Filed Mar. 15, 1961, Ser. No. 95,896
5 Claims. (Cl. 125—23)

This invention comprises a novel and useful equalizer for shear and more particularly relates to a power operated shearing apparatus in which the pressure applied by the shearing elements is equalized across the entire surface of the object to be sheared regardless of irregularities in the surfaces of the object.

In power operating shearing apparatuses such as those employed for cutting rough slabs of stone and in which the two surfaces to be engaged by the shearing blades are of irregular and non-planar contour, the operation of a single rigid shearing blade upon each of these surfaces is frequently ineffective in obtaining a satisfactory shearing of the stone along a desired plane of cleavage. A very important if not a major cause of this difficulty arises from the lack of equality or equalization of the pressure applied by the shearing blade to the irregular surfaces of the stone along the entire line upon which shearing is desired.

It is therefore the primary object of this invention to provide an equalizer construction for shearing apparatuses which will effectively overcome the foregoing difficulty by equalizing the shearing pressures and forces applied to the surfaces of the stone along substantially the entire line of the desired cut of the stone.

A further object of the invention is to provide a device in accordance with the preceding object which will enable the use of a conventional fluid pressure actuating means for effecting the shearing operation of the two jaws of the shearing apparatus while realizing the above-mentioned desired object of effecting an equalization of shearing pressure across the entire surface to be sheared.

A still further object of the invention is to provide an apparatus in accordance with the preceding objects which will enable the ready adapting of the apparatus to special and particular conditions encountered in shearing objects having irregular surfaces through the use of interchangeable cutting bits disposed in side-by-side relation with the bits in individually adjustable position to equalize the pressure applied at the desired line of shearing of a stone and which will maintain a uniform pressure upon the stone throughout the entire length of the line upon which the stone is to be sheared.

Still another object of the invention is to provide a device in accordance with the foregoing objects wherein equalization of the individual bits or elements of the shearing blade members is effected through the use of rigid pressure transmitting and equalizing anti-friction bodies disposed in chambers in the jaws of the shearing apparatus and engaging actuator members on the individual shearing elements.

It is a further and more specific object of the invention to provide a shearing apparatus in which two opposed and cooperating shearing elements constituting blades are power operated in a conventional manner for movement towards and from each other and wherein each shearing element includes a plurality of individual cutter bits individually adjustable and which are individually adjusted through the agency of rigid rollers and/or balls enclosed in a chamber in each jaw element for effecting equalization of the position of each of the cutter bits with regard to the surface to be sheared thereby.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary front elevational view, parts being broken away, of a portion of a conventional type of shearing apparatus especially adapted for the shearing of stone slabs and the like, and to which the pressure equalizing cutter bit assembly of this invention has been applied, the position of an irregular slab of stone as operatively engaged by the cutter bits of the jaws of the shearing apparatus being shown therein in position for the initiation of the shearing operation;

FIGURE 2 is a detail view in vertical transverse section taken upon an enlarged scale substantially upon the plane indicated by the section line 2—2 of FIGURE 1 and showing some interior details of the equalizing chamber and cutter bit assembly of one of the shear apparatus jaw elements;

FIGURE 3 is a view in vertical longitudinal section taken substantially upon the plane indicated by the section line 3—3 of FIGURE 2, parts being broken away, and showing further details of the manner in which the individual cutter bits of the two jaws of the shearing apparatus are self-equalized to effect a uniform cutting action upon a slab having irregular surfaces disposed between the jaws of the shearing apparatus;

FIGURE 4 is an exploded perspective view of one of the cutter bits forming a part of one of the jaws of the shearing apparatus;

FIGURE 5 is a view similar to FIGURE 2 but showing a somewhat modified construction of the pressure equalizing means for the shearing elements of the shearing apparatus;

FIGURES 7–9 are perspective views of various forms of actuators which may be interchangeably employed with the cutter bits; and FIGURE 10 is a perspective view of a roller-type of equalizing elements whose use is disclosed in the embodiment of FIGURES 5 and 6.

Figure 6:
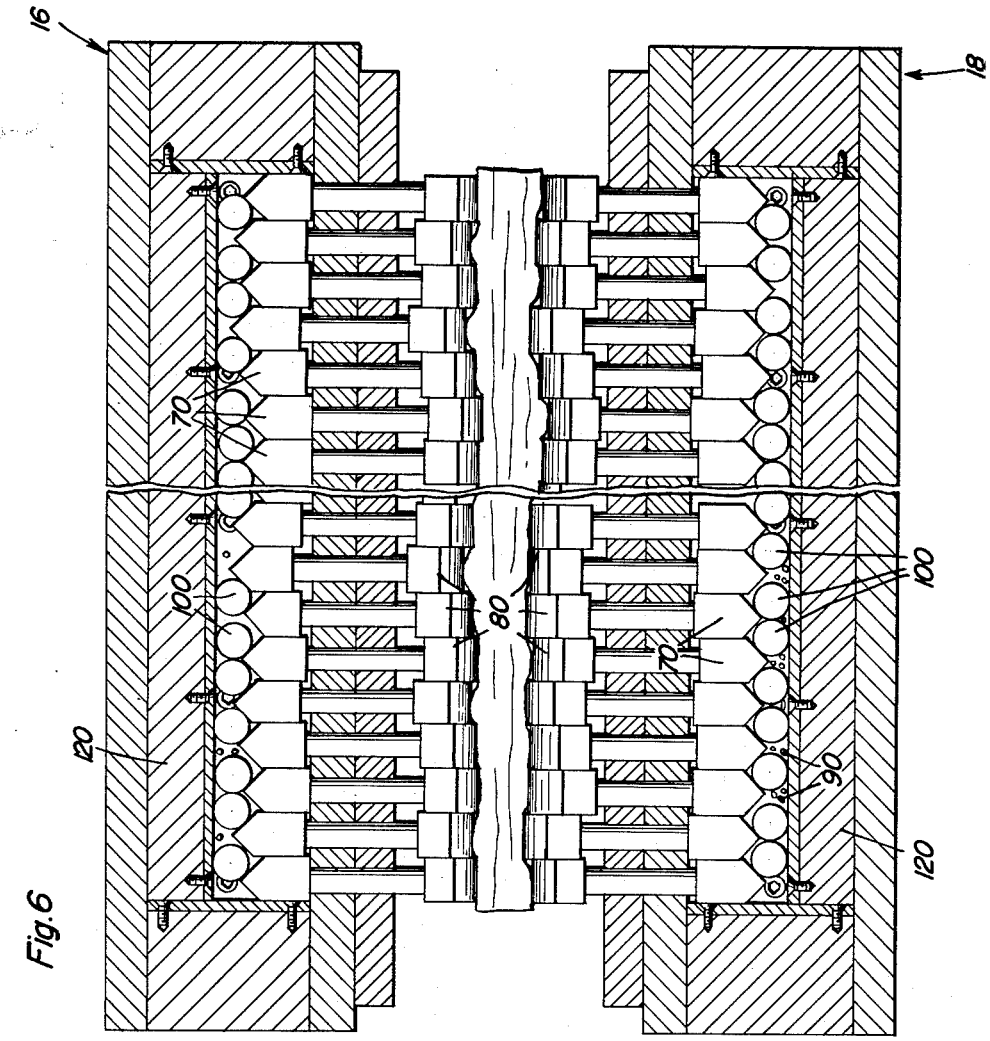
FIGURE 6 is a vertical longitudinal sectional view, parts being broken away, taken substantially upon the plane indicated by the section line 6—6 of FIGURE 5.

Referring first to FIGURE 1 there is indicated generally by the numeral 10 one form of a power-operated shearing device of the type adapted to cut and shear slabs of rock and the like. The device includes a suitable base 12 from which rises a framework 14 upon which are guided for vertical reciprocating movement in a common vertical plane upper and lower shear jaw assemblies 16 and 18, respectively. Power-operated means are provided for effecting reciprocation of the jaw assemblies toward and from each other, these conveniently comprising fluid pressure operated cylinders 20 for the upper jaw and 22 for the lower jaw assembly. It will be understood that these cylinders are provided with a fluid under pressure under suitable control means, not shown, whereby the desired vertical movement may be imparted to the respective jaw assemblies.

Indicated generally by the numeral 24 is a slab of rock or other material to be sheared by the jaws. Such slabs are generally of irregular or non-planar surface on the opposite sides thereof so that there is a very uneven distribution of shearing force applied to and exerted by the knife edges of the two jaw assemblies if a single rigid shear blade is employed.

In accordance with this invention there is provided a pressure equalizing shear blade construction which as illustrated is applied to each of the jaw assemblies 16 and 18. The shear blade assembly of this invention consists of a plurality of cutter disks disposed in side-by-side relation and individually adjustable with respect to each other so as to provide in their entirety a knife edge for each jaw assembly which knife edge will accommodate itself to and correspond to the surface irregularities of the slab to be cut by the device.

Referring now especially to FIGURE 3 in conjunction with FIGURE 2 it will be observed that the shearing jaw assembly 16 or 18 is provided with a hollow chamber 30 therein which extends along the length of the jaw which corresponds to the desired length of cutting edge for the jaw. Inasmuch as the structure of each jaw assembly is identical, the same reference numerals are employed to designate the coresponding components of the upper and lower jaw assemblies 16 and 18.

The jaw assemblies are preferably formed of a generally rectangular block 32 having a vertically extending slot 34 therethrough. This slot is preferably provided with liners in the form of side walls or plates 36 secured to the body of the block 32 as by fasteners 38. There is also provided a further plate 40 secured as by fasteners 42 which comprises the bottom wall of the chamber 30 for the lower jaw assembly 18, with a corresponding plate 40 secured by fasteners 42 comprising the top wall of a corresponding chamber 30 of the upper jaw assembly 16. The two end walls of the chambers 30 are defined by the end wall plates 44 secured by retaining fasteners 46. It will thus be apparent there is defined a generally rectangular space comprising the chamber 30 and which chamber constitutes the equalizing chamber for the plurality of cutter bits in a manner to be now described.

As will be further observed, the body 32 includes top and bottom plates at 48 and 50 which are detachably secured as by the bolts 52 and 54, respectively. The previously mentioned fluid pressure operating cylinders 20 and 22 are secured to the jaw assemblies as by means of connecting links 56 and pivots or bolts 58.

Referring again to FIGURES 2 and 3 in particular, it will be noted that associated with each of the jaw assemblies 16 and 18 there is provided a plurality of cutter bits each of which is designated generally by the numeral 60. These cutter bits are of identical construction and as shown in FIGURE 2 comprise a generally cylindrical stem or shank 62 which is slidably received through corresponding guide bores 64 provided in the top plate 48 of the lower jaw assembly and in the bottom plate 50 of the upper jaw assembly. A further guide member 66 in the form of an elongated bar and likewise provided with guide bores 68 therein is secured to the bottom plate 50 and the top plate 48 of the upper and lower jaw assemblies respectively with the additional bores 68 thus providing further guide means for the stem 62. The inner ends of these stems extend into the chamber 30 and are there connected to a piston member 70 which may be of various types as set forth hereinafter. Conveniently, the stem 62 is provided with a recess or notch 72 therein and a setscrew 74 extending through the wall of the piston 70 engages in this notch 72 to thereby lock the end of the stem in a corresponding axial bore 76 in the end of the piston. Thus, the piston is detachably connected to its stem to comprise an actuating means for effecting reciprocation of the piston as set forth hereinafter.

Upon its exterior end, the piston 70 is provided with with a cutting element 80 which likewise may be of various shapes as required, this cutting element having a bore 82 therein receiving the other end of the stem. The same type of detachable fastening means is provided for the cutter element 80 as was provided for connecting the piston 70, consisting of a recess 84 in the stem in which is received a setscrew 86 of the cutter element 80. It will thus be apparent that either end of the stem may mount the actuating piston 70 and the cutter element 80 as desired.

As so far described it will now be understood from a reference to FIGURE 3 that the cutting elements 80 are disposed in a side-by-side relation and are individually slidable with respect to each other so as to provide in their entirety a knife edge along the cutting face of each shear jaw 16 and 18.

Means are provided for automatically maintaining an equal pressure upon each of the cutter bits despite the irregularities of contour of the slab 24 being cut by the device.

The chamber 30 is filled with a plurality of rigid thrust and pressure transmitting elements. These elements in the form shown in FIGURE 3 comprise a plurality of hard steel balls 90. The chamber is completely filled with these balls which thus at all times are in contact with the exposed surfaces of the piston actuators 70 within the chamber. The arrangement is such that when one piston element is caused to move inwardly of the chamber other piston elements are caused to move outwardly of the chamber. In this manner, when the knife blade is moved toward the slab 24, and the individual cutter elements 80 engage the irregular contour or surface of the slab, and pressure is applied to the shear blade through the actuators 20, 22, the protecting or high portions of the slab will force the corresponding contacting cutter bit inwardly thereby in turn applying pressure to the pressure equalizing elements 90 and moving corresponding cutter elements outwardly. In this manner the cutter elements will adapt themselves to the irregular contour of the slab and thus cause the force applied by the actuating cylinders 20, 22 to be uniformly and equally distributed along the entire length of the slab over the cutting edge of the jaws.

It will be understood that the same operation occurs with the other jaw. In some instances this equalizing action can be applied to a single jaw although it is preferred to effect a cleaner cutting action upon a slab of rock or the like, without the danger of breakage, to use this pressure equalizing principle of this invention in both of the shear jaws.

As previously mentioned, the cutter bits may consist of different contours and styles of cutting elements in accordance with the work to be performed. Further, the piston or actuator element 70 may likewise be of various types. The element 70, as shown in FIGURE 4, has a wedge-shaped or knife edge floor surface. In operation, the pressure equalizing elements 90 will exert their thrust against the inclined lower faces of the element 70. However, a modified form of actuator piston can be provided as replacement for the piston 70, as for example the alternative piston constructions shown in FIGURES 7, 8, 9 and 10 by the numerals 92, 94, 96 and 98, respectively. The element 92 is of generally V-shaped character but has curving and converging inner faces as at 102 to provide a rounded nose in place of the sharp edge or blade portion 104 of the element 70. The actuator 94 in turn may have parallel side walls which at their lower ends have a smoothly rounded convex surfaced portion as at 106. The element 100 may comprise a cylinder whose length is substantially equal to the width between the two base plates 36 of the chamber.

Referring now to the modified construction of FIGURES 5 and 6 it will be observed that the same arrangement previously described is provided and a consequent saving has been applied thereto. However, in this form of the invention the pressure equalizing element comprises a plurality of the cylindrical elements 100 which are disposed between the obliquely angled faces at the adjacent ends of the actuator pistons 70. By properly proportioning the size of the cylindrical rollers 100 with respect to the angles on the oblique faces of the piston actuator 70 it is evident that the same pressure equalizing adjustment of the cutters will be effected. As also shown in FIGURE 6, a plurality of the hardened balls 90 may likewise be utilized, if desired, to further compactly fill the actuating chamber of the device. In this form of the invention there is preferably provided a filler block as shown at 120 which is disposed between the pair of face plates 36, and the previously mentioned plate 40 is secured to this filler block by the fasteners 42. The purpose of this filler block is to reduce the volume of the chamber.

The operation of this form of the invention is identical to that previously described. The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A pressure equalizing blade construction for the jaws of shears comprising a plurality of cutter bits disposed in side-by-side relation and aligned in a row and forming the cutting edges of said jaws, means slidably mounting each of said cutter bits in one of said jaws for individual movement towards and from the other jaw whereby to provide cutting edges for said jaws conformable to the irregularities of surface contour of the object to be sheared, equalizing means engaging each of said cutter bits of one jaw for equalizing therebetween the force exerted thereon during a shearing operation, said one jaw defining a single chamber into which one end of each corresponding cutter bit slidably extends, the portions of said corresponding cutter bits projecting into said chamber and being disposed in side-by-side sliding contacting relation, said equalizing means comprising a plurality of spherical rigid bodies confined in and filling said chamber and physically engaging and applying force to all of said corresponding cutter bits, wherein said bits having piston actuators thereon slidable in said chamber, said actuators having oblique angle surfaces engaged by said rigid bodies.

2. The combination of claim 1 wherein said actuators have complementary slidably engaging side surfaces preventing relative rotation of said bits.

3. A pressure equalizing blade construction for the jaws of shears comprising a plurality of cutter bits disposed in side-by-side relation and aligned in a row and forming the cutting edges of said jaws, means slidably mounting each of said cutter bits in one of said jaws for individual movement towards and from the other jaw whereby to provide cutting edges for said jaws conformable to the irregularities of surface contour of the object to be sheared, equalizing means engaging each of said cutter bits of one jaw for equalizing therebetween the force exerted thereon during a shearing operation, said one jaw defining a single chamber into which one end of each corresponding cutter bit slidably extends, the portions of said corresponding cutter bits projecting into said chamber and being disposed in side-by-side sliding contacting relation, said equalizing means comprising a plurality of spherical rigid bodies confined in and filling said chamber and physically engaging and applying force to all of said corresponding cutter bits, wherein said cutter bits each comprising a stem and a replaceable piston actuator on one end and a replaceable cutter element on the other end.

4. The combination of claim 3 wherein said chamber has removable wear surfaces on its walls.

5. The combination of claim 4 including a guide means mounted upon the jaw and exterior to said chamber and having guide bores slidably receiving said cutter bits.

References Cited in the file of this patent

UNITED STATES PATENTS

| | | |
|---|---|---|
| 2,357,867 | Babbitt et al. | Sept. 12, 1944 |
| 2,552,958 | Graham | May 15, 1951 |
| 2,808,822 | Celapino | Oct. 8, 1957 |
| 2,819,710 | Mangis | Jan. 14, 1958 |
| 3,025,208 | Geiger | Mar. 13, 1962 |

FOREIGN PATENTS

| | | |
|---|---|---|
| 34,082 | Switzerland | Aug. 10, 1905 |